June 10, 1969  T. S. GROHOSKI  3,448,575
SOLAR CELL RECHARGING MEANS FOR A BATTERY OPERATED WATCH
Filed Sept. 29, 1966
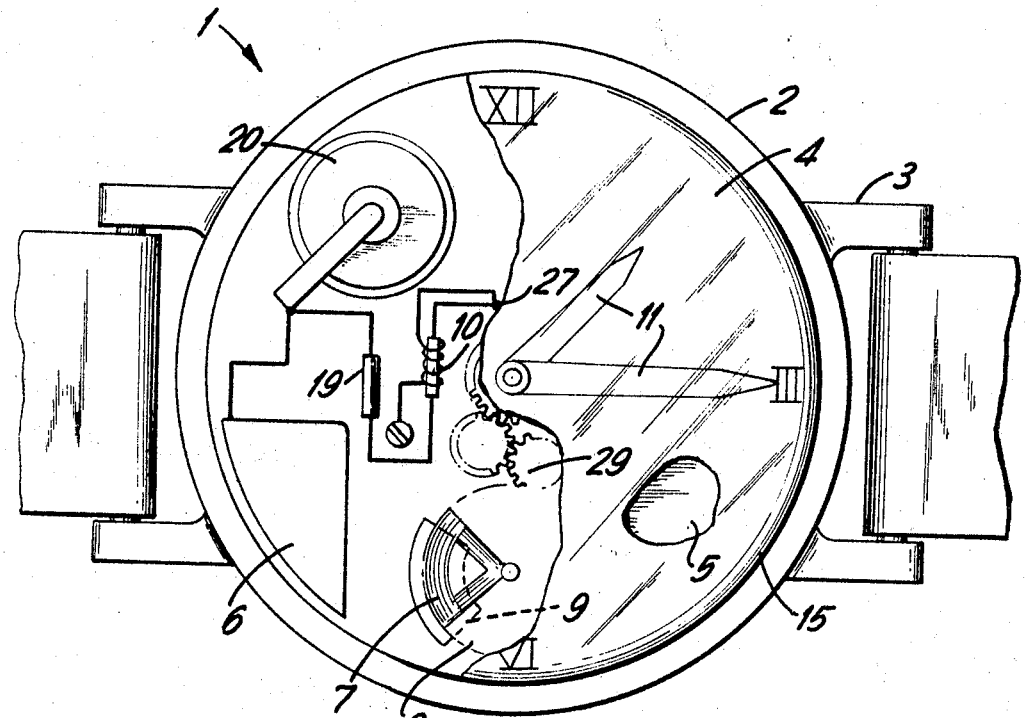
FIG. I
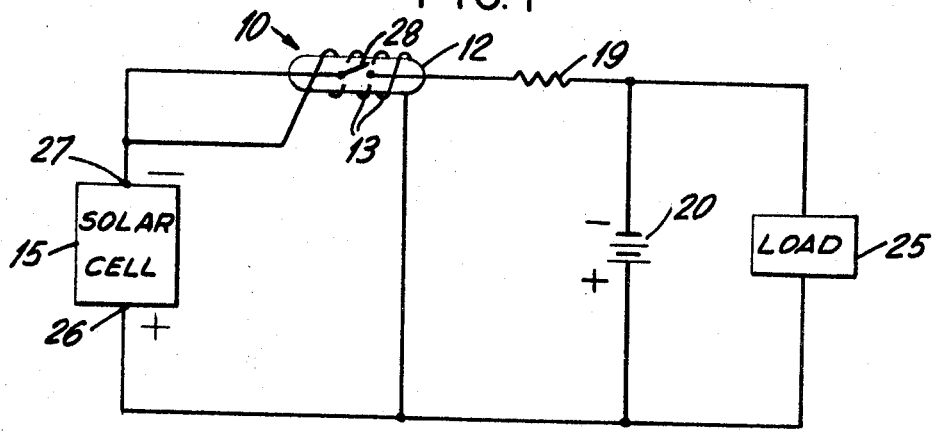
FIG. 2
INVENTOR.
THEODORE S. GROHOSKI
BY
Davis, Hoxie, Faithfull & Hapgood
ATTORNEYS.

United States Patent Office 3,448,575
Patented June 10, 1969

3,448,575
SOLAR CELL RECHARGING MEANS FOR A BATTERY OPERATED WATCH
Theodore S. Grohoski, Woodbury, Conn., assignor to The United States Time Corporation, Waterbury, Conn., a corporation of Connecticut
Filed Sept. 29, 1966, Ser. No. 583,016
Int. Cl. G04c 3/00
U.S. Cl. 58—23      6 Claims

ABSTRACT OF THE DISCLOSURE

An electric timing device, such as a watch, is powered by a rechargeable battery cell. The battery is charged by a solar cell which may be the dial plate of the timing device. The solar cell controls the operation of a switch, which switch disconnects the solar cell from the battery in the absence of sufficient light to charge the battery.

---

This invention relates to an electrical horological device and, more specifically, to an electric circuit for selectively charging the voltage source in an electric watch.

It has long been the goal of watchmakers to create a watch which would be accurate, reasonably small and flat, and which would run for years without being wound or its battery being replaced. One suggestion has been to utilize solar cells, i.e., transducers which convert incident light into electrical energy, as the power source for an electric motor which would operate the watch. As the watch would often be in the dark, it has also been suggested that the solar cell, instead of directly running the motor, would charge a small secondary (rechargeable) battery. The battery whose output current and voltage could be held relatively constant, would supply power for the motor.

A major difficulty with these suggestions has been the limitation of size. The solar cell must be relatively small, no larger than the dial of the watch, and the battery must be small to provide room in the case for the other watch mechanisms. The small size of the battery means that its power cannot be wasted. A serious cause of such waste occurs when the solar cell is not illuminated. At that time it acts as a low impedance path and wastefully drains the battery.

One suggested solution, used in other applications, is to have the solar cell charge the secondary battery through a nonlinear conducting diode. The diode is used to present a low impedance path for the charging current supplied by the solar cell to the battery and a high impedance path for the current from the battery to an inert unilluminated solar cell. Unfortunately, the diode necessarily has a leakage current. When small batteries having a low storage capacity are employed, or when the solar cells are confronted with prolonged dark periods, this leakage current will drain the battery.

It is therefore an objective of the present invention to provide an electric watch having an improved battery charging circuit organization, which watch will run for years without replacing its battery.

More specifically, an objective of the present invention is the provision in an electric watch of a battery charging organization in which the solar cell, when it is inactive, is totally disconnected from the battery.

In accordance with the present invention, a solar cell is the dial, part of the dial or other illuminated portion of a watch. The solar cell is connected to a storage battery via, and in series with, a current limiting resistor and a reed switch. The reed switch control winding is connected in shunt with the solar cell.

When the solar cell generates an output potential which exceeds the battery voltage, the winding of the reed switch is energized. The reed switch contacts are closed and they complete the charging path from the cell to the battery by way of the resistor. When the light diminishes to the point where the solar cell generates an output potential less than that of the battery, insufficient holding current flows through the reed switch winding and the reed switch contacts open. The solar cell does not drain energy from the storage battery when it is insufficiently illuminated or otherwise inactive.

A complete understanding of the present invention, its objectives and other features and advantages thereof may be gained from a consideration of an illustrative embodiment thereof presented hereinbelow in conjunction with the accompanying drawings.

In the drawings:
FIGURE 1 is a top plan view, partially cut-away, of the electric watch of the present invention; and
FIGURE 2 depicts a circuit organization utilized in the watch of FIGURE 1 and embodying the principles of the present invention.

The present invention is described in connection with an electric wristwatch. However, the invention may also be applied to other electric timing devices, including other horological devices such as electric clocks and electronic wristwatches.

The watch 1, shown in FIGURE 1, consists of a case 2 having a bezel 3 adapted for attachment of a watch band. The crystal 4 at the top of the case protects the dial 5. The dial 5 is mounted on the case 2. The dial or a part thereof is a solar cell and is the transducer 15 which changes incident light to electricity. An electrical connection 27 on the dial 5 is connected to a reed switch 10, a resistor 19, and a rechargeable secondary battery 20. Preferably the battery is a miniature nickel-cadmium cell. The battery 20 is connected by well-known means to an electric motor or an electronic circuit 6. A suitable type of circuit is described in Zemla's U.S. Patent 3,046,460. This type of circuit uses two complementary transistors. The circuit 6 is connected to a coil 7 mounted on a balance wheel 8. The coil cooperates with a three-pole flat magnet 9 to drive the balance wheel when the coil is pulsed. Alternatively, a resonator may be utilized in place of the balance wheel. The balance wheel 8 drives gears 29. The gears, by conventional means, turn the hands 11 of the watch.

Referring now to FIGURE 2 of the drawing, there is shown a battery charging circuit organization which includes a voltage source, e.g., a battery 20 and a solar cell transducer 15. The solar cell 15 is connected to the battery 20 via a reed switch 10 and a current limiting resistor 19. An electronic load 25, the motor or driving circuit of the watch, is connected in parallel with the battery 20.

The transducer 15 may be any well-known element for coverting energy present in the environment surrounding the watch into an electrical potential. The solar cell has been described as a single cell. But alternatively, in order to obtain a higher voltage or for convenience in their location, a number of cells may be connected together to form a matrix, in series or in parallel, or both. In all cases, however, the transducer may be considered as a single transducer because it has only effectively two terminals, positive terminal 26 and negative terminal 27.

The reed switch 10, which may embody any of the well-known structures, includes an evacuated glass envelope 12 having two conductive contacts 28 therein. The contacts are selectively closed when current flows in a winding 13 wrapped around the envelope 12 or otherwise electromagnetically coupled to the reed switch 10. When a current at, or exceeding, a threshold level flows through the winding 13, a magnetic field is generated which forces the members 28 into contact. The winding 13 is designed to include sufficient internal impedance so that the contact operating current threshold is reached when the output potential generated by the cell 15 exceeds the quiescent level desired for the battery 20.

The operation of the circuit shown in the drawing is as follows: Assuming the polarity relationship shown in the drawing for the elements 15 and 20, and the incidence of sufficient available light, the cell 15 generates an output potential which exceeds the quiescent or nominal voltage and is sufficient to charge the battery 20. Accordingly, the energized cell 15 provides a conventional current flow from right to left in the reed switch winding 13 which is of a sufficient amplitude to close the contacts 28. A charging current, whose value is principally determined by the difference in the voltage exhibited by the activated solar cell 15 and the battery 20, flows in an upward direction through the battery 20. The load 25 is, of course, continuously energized with the desired battery potential during the charging process.

The above-described charging operation persists as long as the incidence light on cell 15 exceeds the minimum level required to keep the contacts 28 closed. When the light falls below the requisite threshold, the contacts 28 open. When the contacts 28 are open, the battery charging circuitry presents an infinite impedance on the battery 20 and does not drain any battery energy. When the battery charging circuit is in its noncharging disengaged state the only load on the battery 20 is due to the load 25.

The organization shown in FIGURE 2 selectly charges the battery 20 while preventing a loading upon the source 20 when the incidence light becomes insufficient for charging purposes.

A resistor may be serially connected to the winding 13 to control the operative reed switch voltage threshold for the solar cell 15.

What is claimed is:

1. An electric timing device, including in combination a case, a dial mounted on said case, a plurality of time indicating means proximate to said dial, means constituting an electrical load to drive said time indicating means, a single solar cell, a rechargeable voltage source connected to said load, switching means presenting selectly a low impedance and substantially an infinite impedance, and control means for operating said switching means, said switching means connecting said solar cell and said voltage source, and said control means being responsive to the output of said solar cell for selectly operating said switching means;

wherein said control means includes means for selectly enabling said switching means when the output potential generated by said solar cell is at least as great as the potential of said voltage source.

2. A timing device as in claim 1 wherein said transducer is a solar cell.

3. A timing device as in claim 2 wherein the timing device is a wristwatch and the solar cell is the dial of said wristwatch.

4. A timing device as in claim 1, wherein said switching means comprises a reed switch and wherein said control means comprises a winding coupled to said reed switch and connected in parallel with said solar cell.

5. A timing device as in claim 4, further comprising a resistor serially connected to said reed switch.

6. A timing device as in claim 4 wherein said time indicating means includes a plurality of rotatable hands.

References Cited

UNITED STATES PATENTS

| 3,046,460 | 7/1962 | Zemla | 310—15 |
| 3,307,076 | 2/1968 | Park | 317—124 |
| 3,317,809 | 5/1967 | Bowers et al. | 320—30 |

FOREIGN PATENTS

| 1,092,411 | 2/1959 | France. |
| 1,119,215 | 6/1956 | France. |

STEPHEN J. TOMSKY, *Primary Examiner.*

EDITH C. SIMMONS, *Assistant Examiner.*

U.S. Cl. X.R.

58—33

UNITED STATES PATENT OFFICE
CERTIFICATE OF CORRECTION

Patent No. 3,448,575          Dated June 10, 1969

Inventor(s) Theodore S. Grohoski

It is certified that error appears in the above-identified patent and that said Letters Patent are hereby corrected as shown below:

Cancel claim 2;

Renumber claims 3, 4, 5 and 6 as claims 2, 3, 4 and 5;

Renumbered claim 2, change the dependency from "2" to -- 1 --

Renumbered claim 4, change the dependency from "4" to -- 3 --;

Renumbered claim 5, change the dependency from "4" to -- 3 --.

In the heading to the printed specification, line 9, "6 Claims" should read -- 5 Claims --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents